Patented Oct. 5, 1943

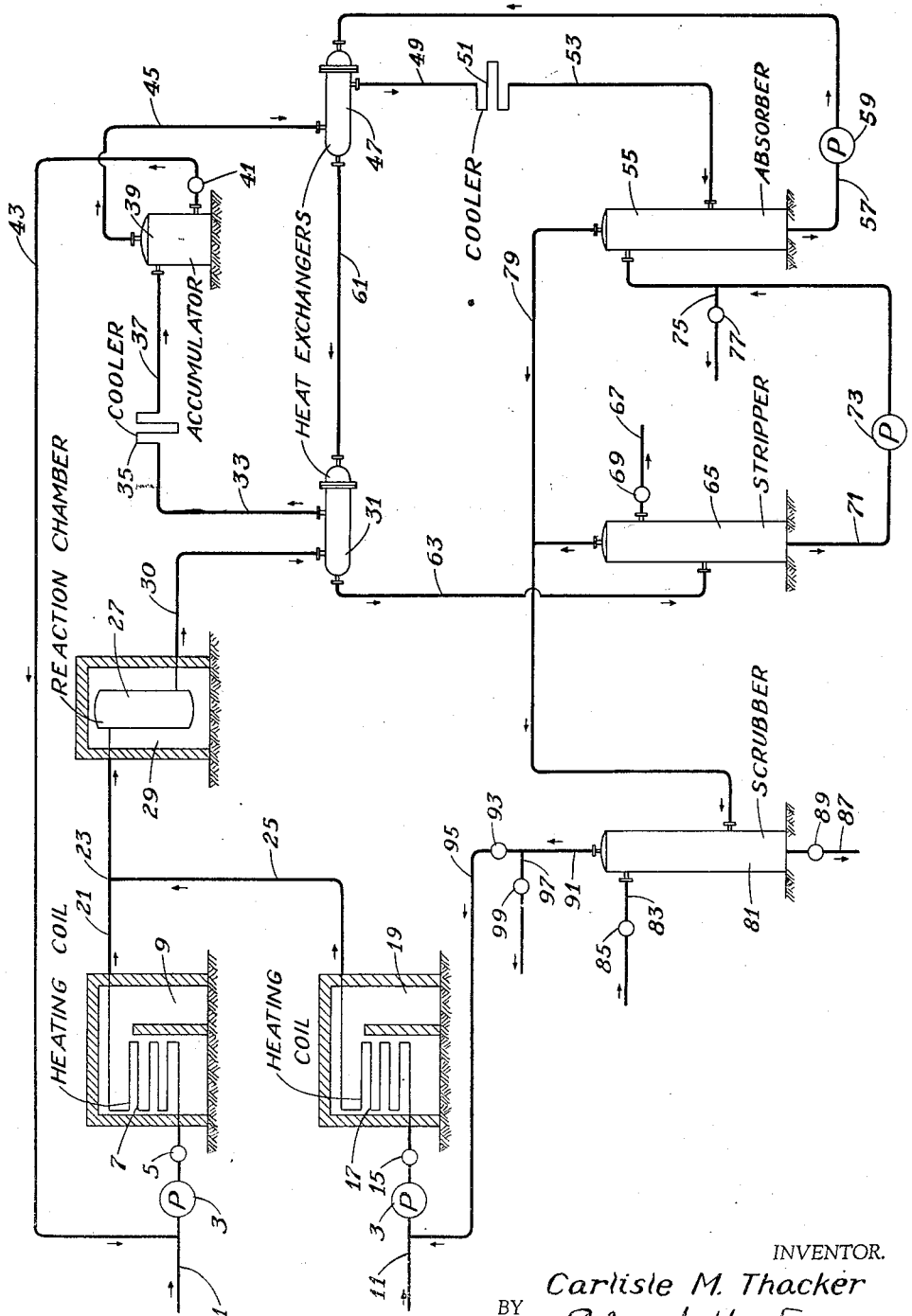

2,330,934

UNITED STATES PATENT OFFICE 2,330,934

SULPHUR OXIDATION OF HYDROCARBONS

Carlisle M. Thacker, Highland Park, Ill., assignor to The Pure Oil Company, Chicago, Ill., a corporation of Ohio Application September 11, 1939, Serial No. 294,319

15 Claims. (Cl. 23—206)

This invention relates to a method for converting hydrocarbons, either pure or mixed, into sulphur compounds, and more particularly to a method for converting hydrocarbons which are gaseous under normal atmospheric conditions into carbon disulphide.

An object of this invention is to provide a method for converting hydrocarbons into organic sulphur compounds.

Still another object of this invention is to provide a method for converting low boiling paraffin hydrocarbons such as methane into liquid carbon disulphide.

A further object of this invention is to provide a catalyst which will effectively promote reaction of sulphur with hydrocarbons.

Another object of the invention is to provide a method for economically recovering a high yield of carbon disulphide from hydrocarbons, particularly low boiling paraffin hydrocarbons.

Other objects of my invention will become apparent from the following description and drawing of which the single figure is a diagrammatic elevational view of apparatus suitable for carrying out the invention.

It has been found that certain catalysts have the ability to promote conversion of normally gaseous paraffinic hydrocarbons such as, for example, methane, into sulphur compounds such as carbon disulphide, at relatively low temperature with production of high yields. Temperatures between 350° C. and 750° C. and preferably temperatures between 450° C. and 700° C. in the presence of sulphur or substances containing sulphur in the free elementary form or substances yielding sulphur under the conditions of operation, are sufficient to produce carbon disulphide in such quantities as to make the process commercially competitive with existing commercial methods. Although low concentrations of sulphur can be used, the sulphur is preferably used in an amount of 10% to 15% in excess of the amount theoretically required for the complete conversion of all of the carbon atoms charged to carbon disulphide taking into consideration the quantity of sulphur necessary for reaction with hydrogen to form hydrogen sulphide for the reason that the reaction progresses at a higher rate with a high concentration of sulphur present.

The promoters or catalysts which have been found to produce high yields of carbon disulphide from low molecular weight paraffin hydrocarbons are silica gel, fuller's earth, bauxite, activated alumina, and in general those types of clay which have been found effective in the removal of color producing and gum forming constituents in petroleum oils. One or more of these catalysts may be used either alone or together with one or more compounds of metals of groups V, VI, VII and VIII of the periodic table. Oxides and sulphides of the aforementioned metals are useful as catalyst promoters. As examples of metal compounds which may be used as promoters in conjunction with the silica gel, fuller's earth or activated alumina are the oxides or sulphides of iron, vanadium, chromium, molybdenum and manganese.

Although the invention is applicable to hydrocarbons generally, it is particularly suitable to the economic conversion of low boiling paraffinic hydrocarbons such as methane. At temperatures of 350° C. or more, carbon disulphide can be readily produced from unsaturated hydrocarbons and from paraffinic hydrocarbons of higher molecular weight than methane such as propane and butane. With methane, appreciable yields are not obtained at temperatures substantially less than 500° C. Since carbon disulphide is the end product in sulphur oxidation as distinguished from partial oxidation products such as mercaptans, thioaldehydes, disulphides, etc., and since carbon disulphide is a relatively stable substance, the upper limit of conversion temperature is dependent largely on economic considerations such as heat input and cost and life of equipment. At higher temperatures corrosion increases perceptibly unless special alloys or noncorrosive linings are used. Consequently, at higher temperatures the capital investment necessarily increases. With the catalysts herein disclosed temperatures over 750° C. give no material increase in yield and temperatures of less than 700° C. are generally used in the conversion of methane. High yields of carbon disulphide can be obtained from methane at temperatures ranging from 550° C. to 700° C.

The process may be carried out at atmospheric, subatmospheric or superatmospheric pressure although relatively low superatmospheric pressures are preferred in order to economically move the reactants and reaction products through the system.

Space velocity, which is the ratio of the total volume of gases, at 0° C. and 760 mm. pressure, passed over the catalyst per hour, to the volume of space occupied by the catalyst, may be varied between rather wide limits depending upon the temperature of operation and nature of the hydrocarbon gas charged, as well as other factors. At a given temperature the conversion per pass decreases slowly with increasing space velocity. The upper limit of space velocity therefore depends largely upon the conversion per pass desired. Increase in temperature permits higher space velocities for the same amount of conversion. With the aforementioned catalysts, high yields of carbon disulphide may be obtained with space velocities from 400 to 3000 and space velocities of 400 or above are generally preferred.

Lower space velocities may be used, but are not desirable because of the small amount of gas that can be charged and consequently the small quantity of end product that can be produced from a unit of given size.

Referring to the drawing, numeral 1 indicates a line through which molten sulphur is pumped by means of pump 3 through flow regulator 5 into heating coil 7 located in furnace 9. The sulphur is preferably heated in furnace 9 to vaporizing temperature. However, if the preheating coil 7 is not composed of alloy highly resistant to corrosion, the sulphur may be heated to a lower temperature, for example, 300–400° C., at which corrosion does not actively take place. The hydrocarbon gas to be converted into carbon disulphide, which in the present instance is indicated as methane, is charged through line 11 by means of pump 13 through flow meter 15 into heating coil 17 located in furnace 19. The methane is preferably heated in the coil 17 to a temperature as high as the temperature of reaction which may be between 500° and 750° C., but may be heated to a lower temperature if desired.

The preheated sulphur leaves the coil 7 through line 21 and is mixed with the heated methane which leaves the coil 17 through the line 25. The mixed gas and sulphur then passes into reaction chamber 27. If a reaction chamber of high corrosion resistant alloy is used or if the reaction chamber is lined with refractory material, it may be desirable to heat the sulphur to a temperature below reaction where excessive corrosion of the coil 7 does not occur and to complete the heating in the reaction chamber 27.

Reaction chamber 27 is filled with the desired catalyst preferably in granular form through which the mixed gas and sulphur vapor passes. The catalyst, as previously stated, may be silica gel, fuller's earth, bauxite, catalytic clay and activated alumina, or any one or more of these materials impregnated with one or more metallic compounds of the fifth, sixth, seventh and eighth groups of the periodic table.

If the chamber is to be externally heated, it is preferably placed in a furnace setting 29; however, if the reaction chamber is constructed of metal which has a low resistance to sulphur corrosion, it is preferably lined with refractory material and is equipped with an internal electrical heating element to provide the required temperature in the reaction zone. It will be apparent that with high molecular weight hydrocarbons, reaction temperatures below the vaporization point of sulphur may be used, in which case it is preferable to use a finely divided rather than a granular catalyst in order to facilitate contact of the reactants with the catalyst.

The reaction products leave the lower portion of the reaction chamber 27 through line 30, pass through heat exchanger 31 where they are partially cooled, leave the heat exchanger through line 33, pass through cooler 35 where the products are cooled to a temperature below the vaporization temperature of sulphur, but not below the vaporization temperature of carbon disulphide. This temperature may range from 120° to 150° C. From the cooler the reaction products pass through line 37 into accumulator 39 wherein the condensed sulphur is collected. This sulphur is recycled back to the line 1 through flow regulator 41 and line 43. The products which remain uncondensed, including the carbon disulphide, hydrogen sulphide and unconverted methane or other gas, leave the top of the accumulator 39 through line 45, pass through heat exchanger 47 wherein the temperature is reduced, leave the heat exchanger through line 49, pass through cooling coil 51 wherein the temperature is reduced to approximately 24° to 38° C., and then through line 53 into the lower portion of absorber 55. If the process is operated at atmospheric or low superatmospheric pressure, it may be desirable to compress the gases and vapors in line 53 by means of a compressor not shown, before entering the absorber. In the absorber 55 the uncondensed carbon disulphide and reaction gases pass countercurrent to a stream of absorption oil such as mineral, seal oil or light gas oil.

The temperature in the absorber is preferably maintained at a temperature approximating the temperature of the reaction products entering the absorber. The rich absorption oil is withdrawn from the bottom of the absorber through line 57 by means of pump 59, passing through heat exchanger 47 wherein it is heated by indirect heat exchange with reaction products from which the sulphur has been removed, then passing through line 61 into heat exchanger 31 where it is further heated by indirect heat exchange with the reaction products issuing from the reaction chamber. From the heat exchanger 31 the rich absorption oil which may now be at a temperature of approximately 120° to 175° C. is withdrawn through line 63 and enters the intermediate portion of the stripper 65. In the stripper the absorbed carbon disulphide and lighter material is separated from the absorption oil and by means of suitable fractionating plates the carbon disulphide is condensed in the upper portion of the stripper and withdrawn therefrom through line 67 controlled by valve 69. The lean absorption oil is withdrawn from the bottom of stripper 65 through line 71 by means of pump 73 and returned to the upper portion of the absorber 55. A line 75 controlled by valve 77 is provided in order to add additional absorber oil to the system or to withdraw excess oil therefrom.

The methane, hydrogen sulphide and other vapors or gases not absorbed in absorber 55 are withdrawn from the top thereof through line 79 and passed to the lower portion of scrubber 81. In the scrubber 81 the unabsorbed gases and vapors pass countercurrent to a scrubbing solution which is charged into the top of the scrubber through line 83 controlled by valve 85. The scrubbing solution may be aqueous sodium carbonate, sodium phosphate or organic absorbent capable of absorbing hydrogen sulphide. The spent scrubbing solution is withdrawn from the bottom of the scrubbing tower through line 87 controlled by valve 89 and may either be discharged entirely from the system or may be subjected to treatment for recovery of sulphur for use in the process. In any case, the scrubbing solution should be regenerated for re-use in a known manner.

The methane and other hydrocarbon gas freed of hydrogen sulphide leaves the top of the scrubber 81 through line 91 and may either be recycled to line 11 through valve 93 and line 95 or may be withdrawn from the system through line 97 controlled by valve 99. By proper regulation of valves 93 and 99, any desired portion of the gas from line 91 may be recycled or withdrawn from the system.

Although I have disclosed a method and apparatus suitable for carrying out my invention, it will be apparent that other apparatus may be used. For example, the sulphur and the hydrocarbon gas may be mixed by atomizing molten sulphur into the gas and the mixture preheated to any desired temperature and then passed to the reaction chamber.

The following table contains data from actual runs made with various catalysts:

Table

| | Catalyst | | | |
|---|---|---|---|---|
| | Alorco | Silica gel | Florite | Alorco (Al$_2$O$_3$) chromium (20:1) |
| Temp., °C | 600–605 | 599–602 | 600–602 | 602–606 |
| Space velocity | 694 | 844 | 850 | 860 |
| Mol ratio of CH$_4$ to S$_2$ | 0.69 | 0.50 | 0.48 | 0.49 |
| Yield, gal. CS$_2$ per 1000 cu. ft. CH$_4$ charged | 11.2 | 14.3 | 13.2 | 13.7 |

The liquid product produced in those runs was substantially pure carbon disulphide containing only traces of partial oxidation products (sulphur compounds) and less than 2% of hydrogen sulphide as impurities.

"Alorco" is an activated alumina sold by the Aluminum Ore Company. "Florite" is a trade name for bauxite sold by the Floridin Company. The Alorco-chromium catalyst as freshly prepared consisted of chromium oxide deposited from a solution of chromium salt on the "Alorco." In the runs listed in the table the silica gel, obtained from the Silica Gel Corporation, was extracted with 1:1 hot hydrochloric acid for eight hours and then with water for eight hours more and finally dried at 110° C. The "Florite" was treated in the same manner as the silica gel. This treatment was carried out to remove any soluble salts from the material in order to determine the effectiveness of the catalyst as compared to an unextracted sample. Both were equally as effective as the unextracted catalyst.

Wherever used in the claims "space velocity" shall mean volume of gas at 0° C. and 750 mm. pressure passed over the catalyst per hour divided by the volume of the space occupied by the catalyst.

I claim:

1. The method for converting hydrocarbons to carbon disulphide which comprises contacting said hydrocarbons in the presence of sulphur with a catalyst selected from the group consisting of silica gel, bauxite, catalytic clays of the type which are effective in the removal of color producing and gum forming constituents in petroleum oils and activated alumina, at a temperature between approximately 450° C. and 700° C.

2. Method in accordance with claim 1 in which the catalyst is silica gel.

3. Method in accordance with claim 1 in which the catalyst is bauxite.

4. Method in accordance with claim 1 in which the catalyst is activated alumina.

5. The method of converting hydrocarbons into carbon disulphide which comprises heating said hydrocarbons to reacting temperature, separately preheating sulphur to elevated temperature, mixing the heated hydrocarbons and sulphur and contacting the mixture in a reaction zone maintained at reaction temperature of approximately 450° C. to 700° C. with a sulphur oxidation catalyst selected from the group consisting of silica gel, bauxite, catalytic clays of the type which are effective in the removal of color producing and gum forming constituents in petroleum oils and activated alumina, cooling the reaction products sufficiently to liquefy any unreacted sulphur but not sufficiently to liquefy carbon disulphide, separating carbon disulphide and other uncondensed products from the sulphur, recycling the sulphur to the process and separating the carbon disulphide from the remaining reaction products.

6. Method in accordance with claim 5 in which the sulphur is preheated to a temperature approaching as closely as possible the desired reaction temperature, but below the temperature at which active corrosion of the heating means takes place.

7. Method in accordance with claim 5 in which both the hydrocarbons and the sulphur are preheated to a temperature within the desired reaction temperature range.

8. Method in accordance with claim 5 in which the sulphur is preheated to a temperature below reaction temperature and the reaction zone is heated internally to bring to and maintain the reactants at the desired reaction temperature.

9. Method of converting normally gaseous hydrocarbons into carbon disulphide which comprises contacting said hydrocarbons in the presence of a sufficient amount of material selected from the group consisting of sulphur and material yielding sulphur at contacting temperature to react with all the carbon atoms charged with a catalyst selected from the group consisting of silica gel, bauxite, catalytic clays of the type which are effective in the removal of color producing and gum forming constituents in petroleum oils and activated alumina at temperatures between 450° and 700° C.

10. Method in accordance with claim 9 in which the catalyst is activated alumina impregnated with a promoter selected from the group consisting of the compounds of metals of the V, VI, VII and VIII groups of the periodic table.

11. Method in accordance with claim 9 in which the catalyst is activated alumina.

12. Method in accordance with claim 9 in which the catalyst is activated alumina impregnated with chomium oxide.

13. Method in accordance with claim 1 in which the amount of sulphur is sufficient to react with all carbon atoms present and the space velocity is between approximately 400 and 3000 volumes per hour.

14. Method in accordance with claim 1 in which the hydrocarbon converted is methane, the amount of sulphur is sufficient to react with all carbon atoms present and the space velocity is between approximately 400 and 3000 volumes per hour.

15. The method for converting gas consisting chiefly of methane to carbon disulphide which comprises contacting said gas with sufficient sulphur to react with all carbon atoms present in the presence of a catalyst selected from the group consisting of bauxite, catalytic clays of the type which are effective in the removal of color producing and gum forming constituents in petroleum oils, silica gel, and activated alumina, at temperatures ranging from 500° C. to 700° C.

CARLISLE M. THACKER.